United States Patent Office 2,945,880
Patented July 19, 1960

2,945,880

PROCESS FOR THE PREPARATION OF THIOGLYCOLIC ACID AND SALTS THEREOF

David O. De Pree and William R. Eller, Baton Rouge, La., assignors to Ethyl Corporation, New York, N.Y., a corporation of Delaware No Drawing. Filed Dec. 23, 1957, Ser. No. 704,250

4 Claims. (Cl. 260—526)

This invention relates to thioglycolic acid and more particularly to a novel and improved process for its preparation.

Thioglycolic acid is a commercial product of considerable use to the industry. Its principal utility resides in the formulation of compositions used as wave sets for setting hair. It is also used as a depilatory. Another particular use is that certain salts thereof are excellent stabilizers for plastics. For example, when thioglycolic acid is reacted with a tin salt the corresponding tin salt of thioglycolic acid is obtained. This salt, when added in minor proportion in the formation of vinyl polymers, is an excellent stabilizer for such polymers effecting a vinyl plastic of improved properties.

Thioglycolic acid is prepared commercially by the reaction of the sodium salt of chloro acetic acid with sodium hydrogen sulfide to produce the sodium salt of dithiodiglycolic acid and the by-product disodium thiodiglycolate. The reaction mixture is then acidified and subjected to catalytic hydrogenation or a similar reduction method resulting in the ultimate product thioglycolic acid and the by-product thio-diglycolic acid. This process suffers certain inherent disadvantages. The formation of the aforementioned by-product is especially undesirable. This material is deleterious to thioglycolic acid and its ultimate uses. Thus, the reaction mixture must be subjected to tedious separation techniques. Even then adequate separation is not obtained. In addition it is recognized that the economies of the process can be further improved. In particular, the use of sodium hydrogen sulfide is costly and the treatment of the intermediate along with separation of the byproduct are additional operations adding to the difficulties of the process and the ultimate cost of the thioglycolic acid. It is therefore desirable to the industry to eliminate any or all of these inherent problems, particularly the by-product formation and the operations required to convert the sodium salt of dithioglycolic acid to thioglycolic acid.

Thus, it is an object of this invention to provide a new and improved process for the manufacture of thioglycolic acid and its salts. A particular object is to overcome the disadvantages of the present commercial process while still improving the economics and yield of the desired products. A still further object is to produce thioglycolic acid in high yield and purity while still providing a process employing different reactants, namely sulfur and unique organometallic compounds. These and other objects of this invention will be apparent from the description hereinafter.

The novel process of this invention comprises reacting alpha-metallo-metallic acetates containing two carbon atoms and wherein the metallic elements are selected from the group consisting of alkali and alkaline earth metals with sulfur at a temperature of at least about 100° C. in the presence of a solvent for the sulfur. It has been found that the reaction does not commence until a temperature of at least about 100° C. is obtained. Likewise, a solvent having some solubility for the sulfur is necessary in order to obtain the desired product. For this purpose aromatic hydrocarbons having a boiling point above about 100° C. are especially well suited. Of the alpha-metallo-metallic acetates those wherein the metallic elements are alkali metals are preferred. A particularly preferred embodiment of this invention comprises the reaction of alpha-sodio-sodium acetate with sulfur at a temperature between about 110–175° C. in the presence of an aromatic hydrocarbon, preferably having a boiling point within the aforementioned temperature range. The alkali or alkaline earth metal salt prepared as described above is readily converted to thioglycolic acid by conventional techniques of hydrolysis.

Thus the process provides a new and direct method for the preparation of salts of thioglycolic acid which are readily converted to thioglycolic acid. Among the advantages of the process is the fact that elemental sulfur is employed resulting in a considerable saving and economy. An additional advantage of the process is that the operations of the prior art technique requiring acidification and reduction of the intermediate sodium salt of dithioglycolic acid are avoided. Likewise no formation of the deleterious by-product, thio-diglycolic acid or its salt is obtained. The process of this invention further provides a more controlled oxidation procedure resulting in higher yields and purity of thioglycolic acid or its salt. Other benefits of the present invention will be evident as the discussion proceeds.

The novel process will be more completely understood by reference to the following examples. In each instance all parts and percentages are by weight unless otherwise specified.

Example I

Alpha-sodio sodium acetate was prepared by reacting 100 parts of sodium amide with 210.2 parts of anhydrous sodium acetate in a nitrogen purged reaction vessel. A preblend of these materials in a charging vessel was continuously fed to the reactor at a rate such that with external heating the temperature could be maintained between 220° and 240° C. The ammonia which was liberated was continuously withdrawn. The overall reaction required about 1 hour and 15 minutes. Of the alpha-sodio-sodium acetate thus prepared 60.3 parts were placed in a reactor equipped with internal agitation, a reflux condenser and external heating. To the reactor was then added 215 parts of toluene. Then 32 parts of sulfur dissolved in 215 parts of toluene were added and the mixture heated to the reflux temperature. These conditions were maintained for a period of 8 hours. The reaction mixture was then cooled and a portion thereof treated with water. The sulfur was filtered from this portion and the water solution was evaporated to dryness. One part of the sodium salt was reacted with thionylchloride at reflux for 30 minutes. The mixture was cooled and 1–2 parts of p-toluidine in 20 parts benzene were added. The mixture was then warmed on a steam bath for 2 minutes. The benzene solution was decanted and washed with 2 parts of water, 5 parts of 5 percent hydrochloric and 5 parts of 5 percent sodium hydroxide. The benzene was evaporated and the derivative recrystallized from ethanol. The p-toluidine derivative thus prepared had a melting point of 120–123° C. which compared to the reported melting point of 125–126° C. Thus it was established that the sodium salt of thioglycolic acid was obtained. The remainder of the reaction mixture was filtered to remove the sodium salt. The sodium salt was then hydrolyzed with water and acidified with HCl to result in a water solution of thioglycolic acid.

When attempts were made to perform the above example at lower temperatures, by gradual heating from room temperature, it was found that no apparent reaction took place until a temperature of about 100° C. was reached.

Example II

In this run 60 parts of alpha-sodio-sodium acetate, prepared as in Example I, are charged to the reactor and then 110 parts of diethyl aniline are added thereto. The reaction mixture is heated to a temperature of 120° C. and a solution of 32 parts of sulfur in 110 parts of diethyl aniline is slowly added over a period of 1 hour. The reaction mixture is held at 120° C. for an additional period of 3 hours. Thioglycolic acid is recovered in high yield by hydrolysis and fractional distillation.

Example III

The procedure of Example I is repeated with the exseption that an equivalent amount of mineral oil (boiling point range 277 to 312° C.) is employed in place of the toluene with the reaction being conducted at 200° C. Thioglycolic acid is obtained in high yield.

Example IV

Alpha-calcio-calcium acetate prepared according to the procedure employed for the preparaiton of alpha-sodio-sodium acetate in Example I, 98 parts, are reacted with 32 parts of sulfur employing 200 parts of the dimethyl ether of diethylene glycol at the reflux temperature (161° C.) for 6 hours. The calcium salt of thioglycolic acid is recovered in high yield by filtration.

The following example will demonstrate a more preferred procedure of the process of this invention resulting in higher yields of the desired products.

Example V

A portion of the alpha-sodio-sodium acetate, 104 parts, prepared in Example I is added to a reactor essentially the same as that of Example I with the exception that a "Soxhlet" extractor was placed between the reflux condenser and the reactor. Into the reactor was added 215 parts of toluene and then 32 parts of sulfur were added to the thimble. The reactor was then externally heated to the refluxing temperature of the toluene (110° C.). In this manner the vapors contact the sulfur in the "Soxhlet" extracting the sulfur and returning it to the liquid phase in the reactor. This system provides greater control of the oxidation of the alpha-sodio-sodium acetate. The conditions are maintained for 4 hours. At the end of this period the reaction mixture is cooled and filtered then hydrolyzed with water and HCl. The resulting mixture is subjected to fractional distillation recovering thioglycolic acid in high yield.

Example VI

When 104 parts of alpha-sodio-sodium acetate are reacted with 32 parts of sulfur in 200 parts of tripropyl amine as the solvent according to the procedure of Example V at reflux conditions for 3 hours thioglycolic acid is obtained in high yield.

Example VII

Alpha-lithio-lithium acetate is reacted with sulfur according to the procedure of Example V employing cycloheptane as the solvent at reflux conditions. The lithium salt of thio glycolic acid is obtained in high yield and converted to thio glycolic acid by hydrolyzing with water and sulfuric acid.

Example VIII

When 101 parts of alpha-sodio-calcium acetate are reacted with 32 parts of sulfur according to the procedure of Example V employing 200 parts of ethylamyl ether as the solvent at the reflux temperature (120° C.) for a period of 3 hours. The corresponding salt of thioglycolic acid is obtained in high yield.

The foregoing examples are presented merely as typical illustrations of the process of the present invention and it is not intended to be limited thereby.

The alpha-metallo-metallic acetates are compounds containing two carbon atoms and in which the metallic elements are selected from the group consisting of alkali and alkaline earth metals. These compounds can be depicted by the following structural formula:

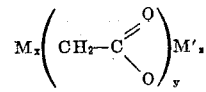

wherein M and M' can be the same or different and are alkali or alkaline earth metals and $x$, $y$, and $z$ are small whole numbers dependent upon the valence of M and M'. The alkali metals are intended to include the metals of group I-A of the periodic chart of the elements. Likewise the alkaline earth metals include the metals of group II-A of the periodic chart as set forth in the Handbook of Chemistry and Physics, 35th ed., Chemical Rubber Publishing Co., at page 392. Thus, among the compounds thereby described which can be substituted for the alpha-metallo-metallic acetate employed in the preceding examples are included alpha-sodio-potassium acetate, alpha-lithio-potassium acetate, alpha-potassio-potassium acetate, alpha-lithio-barium acetate, alpha-calcio-sodium acetate, alpha-bario-cerous acetate, and the like wherein the other alkali and alkaline earth metals are substituted for the metals named hereinbefore.

The proportions of the reactants are not critical. However, generally between about the stoichiometric amount and a 100 percent excess of the sulfur is employed. Employing the sulfur in a greater excess is not desirable since excessive oxidation may take place resulting in a reduced yield to the desired product. For most effective results and highest yield it is preferred to employ between about the stoichiometric amount and 10 percent in excess thereof of the sulfur.

As indicated above the temperature employed is at least about 100° C. It has been found that the reaction does not proceed to result in the desired salt of thioglycolic unless this temperature is attained. Generally speaking, the temperature employed will be between about 100 to 250° C. In order to obtain faster reaction rates, it is preferable to employ a temperature between about 110 to 175° C. In the especially preferred embodiment of this invention wherein an extractive solution of the sulfur is formed by the condensing vapors of the solvent, the reflux temperature of the solvent is employed. Such a refluxing system provides a controlled oxidation of the alpha-metallo-metallic acetate enhancing the yields of the salt of thioglycolic acid and minimizing the formation of undesirable by-products. In general, atmospheric pressure is employed during the course of the reaction.

The time of reaction is not critical since some product is prepared immediately upon contact of the sulfur with the metallo-metallic acetate at the designated temperatures. Ordinarily the reaction time varies from about ½ minute to 10 hours. In the preferred operation, reaction times of ½ minute to 5 hours are employed to minimize excessive oxidation of the product.

The solvents employed in the process are many and varied. The general criteria of such solvents are that they exhibit some solubility for sulfur, have a boiling point above 100° C., and be essentially inert to the reactants and product. The solubility of the sulfur in such solvents need be only slight as between about 0.0025 to 0.005 part of sulfur per part of the solvent at reaction temperature. It is preferable, however, that the solvent exhibit solubility between about 0.01 part to 0.2 part of sulfur per part of the solvent at reaction temperature. Among such diluents which can be employed are included the hydrocarbons, including both aliphatic and aromatic, the tertiary amines, preferably the lower alkyl tertiary amines, and the ethers, especially the polyethers. Generally such solvents will contain less than about 18 carbon atoms. Typical examples of such solvents include the octanes, nonanes and the like up to and including octadecane, Decalin, toluene, xylene, tetralin and the like aromatic hydrocarbons, and mixtures of hydrocarbons as for example mineral oil, gasoline and kerosene and ethers such as ethylamyl ether, diamyl ether, the dimethyl, diethyl and dibutyl ethers of diethylene glycol, ethyl benzylether and the like and alkyl amines such as tripropyl triamyl and the like up to and including those containing about 8 carbon atoms in each alkyl group, diethyl aniline, tricyclohexyl amine and the like. The aromatic hydrocarbons are especially preferred since such materials are more economical, have greater solubility for the sulfur, and produce the best results. The proportion of the solvent employed is not critical and can vary over a wide range. In general, between about 10 parts to 1 part of the solvent per part of the sulfur are employed.

As indicated previously the salt of thioglycolic acid which is directly prepared in the reaction can be employed as such whether recovered or remaining in the solvent. In order to convert the salt to thioglycolic acid the conventional hydrolysis procedures are applicable. The salt is dissolved in water then acidified with an inorganic acid such as hydrochloric, sulfuric, phosphoric and the like acids. The thioglycolic acid is then recovered from the water solution by extraction or distillation.

Having thus described the process of the invention it is not intended that it be limited except as set forth in the following claims.

We claim:

1. A process for the preparation of metal salts of thioglycolic acid which comprises reacting an alpha-metallo-metallic acetate containing two carbon atoms wherein said metallo and metallic elements are selected from the group consisting of alkali and alkaline earth metals with sulfur at a temperature between about 100 to 250° C. in the presence of a solvent for the sulfur.

2. A process for the manufacture of thioglycolic acid which comprises reacting alpha-sodio-sodium acetate with sulfur at a temperature between about 100 to 250° C. in the presence of toluene and converting the sodium salt of thioglycolic acid obtained to thioglycolic acid by hydrolysis.

3. The process of claim 1 in which the metallo and metallic elements are alkali metals.

4. The process of manufacturing the sodium salt of thioglycolic acid which comprises heating a mixture of alphasodio-sodium acetate, sulfur, and an aromatic hydrocarbon solvent for the sulfur, to a temperature of from about 100 to 250° C. to cause said acetate to react with the sulfur.

References Cited in the file of this patent

Bordwell et al.: J.A.C.S., vol. 76 (1954), pp. 1082–85.